United States Patent
Wong (10) Patent No.: US 12,006,334 B2
(45) Date of Patent: Jun. 11, 2024

(54) ALKYNYLPLATINUM (II) TERPYRIDINE SYSTEM COUPLED WITH RHODAMINE DERIVATIVE: INTERPLAY OF AGGREGATION, DE-AGGREGATION AND RING-OPENING PROCESSES FOR RATIOMETRIC LUMINESCENCE SENSING

(71) Applicant: SOUTH UNIVERSITY OF SCIENCE AND TECHNOLOGY OF CHINA, Shenzhen (CN)

(72) Inventor: Keith Man Chung Wong, Shenzhen (CN)

(73) Assignee: South University of Science and Technology of China, Guangdong (CN)

( * ) Notice: Subject to any disclaimer, the term of this patent is extended or adjusted under 35 U.S.C. 154(b) by 1050 days.

(21) Appl. No.: 16/767,807

(22) PCT Filed: May 10, 2018

(86) PCT No.: PCT/CN2018/086319
§ 371 (c)(1),
(2) Date: May 28, 2020

(87) PCT Pub. No.: WO2019/213894
PCT Pub. Date: Nov. 14, 2019

(65) Prior Publication Data
US 2021/0002312 A1    Jan. 7, 2021

(51) Int. Cl.
C07F 15/00    (2006.01)
C09K 11/06    (2006.01)
G01N 21/64   (2006.01)

(52) U.S. Cl.
CPC .......... C07F 15/0086 (2013.01); C09K 11/06 (2013.01); G01N 21/6428 (2013.01);
(Continued)

(58) Field of Classification Search
CPC .................................................. C07F 15/0086
(Continued)

(56) References Cited

U.S. PATENT DOCUMENTS 8,057,989 B2    11/2011    Yam et al.
2013/0228758 A1    9/2013    Yam et al.

FOREIGN PATENT DOCUMENTS

CN    101360739 A    2/2009
CN    102495055 A    6/2012

OTHER PUBLICATIONS

Huang et al. "Room-Temperature Long-Lived 3 IL Excited State of Rhodamine in an NAN PtII Bis(acetylide) Complex with Intense Visible-Light Absorption" Eur. J. Inorg. Chem. 2011, 4527-4533 (Year: 2011).*
(Continued)

*Primary Examiner* — Christine T Mui
*Assistant Examiner* — Emily R. Berkeley
(74) *Attorney, Agent, or Firm* — KDW Firm PLLC (57) ABSTRACT

The synthesis and characterization of a platinum (II) terpyridine system tethered with a latent organic dye of rhodamine derivative as colorimetric and fluorescent sensory moiety has been reported to show selective $Hg^{2+}$ ion sensing behavior. The interplay of aggregation/de-aggregation behavior of the alkynylplatinum(II) terpyridine complex and the ring-opening process of rhodamine derivative has been investigated. The spectral change of aggregation NIR emission at 800 nm and rhodamine fluorescence at 585 nm provides a possible ratiometric luminescence measurement. Morphological studies from TEM and SEM images showing nanospherical structures confirmed the aggregation in the absence of $Hg^{2+}$ ion.

5 Claims, 11 Drawing Sheets

(52) U.S. Cl.
CPC ............... *C09K 2211/1077* (2013.01); *C09K 2211/185* (2013.01); *G01N 2021/6439* (2013.01)

(58) Field of Classification Search
USPC ......................................................... 436/81
See application file for complete search history.

(56) References Cited

OTHER PUBLICATIONS

Zhang et al. "A two-photon excited luminescence of water-soluble rhodamine-platinum(II) complex: Fluorescent probe specific for Hg2+ detection in live cell" Talanta 83 (2010) 658-662 (Year: 2010).*

Bailey et al., "Electronic Spectroscopy of Chloro(terpyridine)platinum(II)," Inorganic Chemistry, vol. 34, No. 18, (1995), pp. 4591-4599.

Chan et al., "Parallel folding topology-selective label-free detection and monitoring of conformational and topological changes of different G-quadruplex DNAs by emission spectral changes via FRET of mPPE-Ala-Pt(II) complex ensemble," Chem. Sci. (2016), 7, pp. 2842-2855.

Chung et al., "Induced Self-Assembly and Förster Resonance Energy Transfer Studies of Alkynylplatinum(II) Terpyridine Complex Through Interaction With Water-Soluble Poly(phenylene ethynylene sulfonate) and the Proof-of-Principle Demonstration of this Two-Component Ensemble for Selective Label-Free Detection of Human Serum Albumin," J. Am. Chem. Soc. (2011), 133, pp. 18775-18784.

Chung et al., "Synthesis and Electrochemical, Photophysical, and Self-Assembly Studies on Water-Soluble PH-Responsive Alkynylplatinum(II) Terpyridine Complexes" Inorganic Chemistry, Apr. 25, 2016 (Apr. 25, 2016), pp. 4650-4663.

Connick et al., "Excited-State Self-Quenching Reactions of Square Planar Platinum(II) Diimine Complexes in Room-Temperature Fluid Solution," Inorg. Chem. (1999), 38, pp. 3264-3265.

Hissler et al., "Platinum diimine complexes: towards a molecular photochemical device," Coordination Chemistry Reviews, ( 2000), 208, pp. 115-137.

Jennette et al., "Metallointercalation reagents. 2-hydroxyethanethiolato (2,2',2''-terpyridine)-platinum(II) monocation binds strongly to DNA by intercalation," Proc. Natl. Acad. Sci. U. S. A. (1974), vol. 71, No. 10, pp. 3839-3843.

Kui et al., "Spectacular luminescent behaviour of tandem terpyridyl platinum(II) acetylide complexes attributed to solvent effect on ordering of excited states, "ion-pair" formation and molecular conformations," Chemical Science, (2011), 2, pp. 221-228.

Li et al., "A Molecular Chameleon with Fluorescein and Rhodamine Spectroscopic Behaviors," Inorg. Chem. (2016), 55, pp. 205-213.

Li et al., "Highly phosphorescent platinum (II) emitters: photophysics, materials and biological applications," Chem. Sci. (2016), 7, pp. 1653-1673.

Li et al., "Rhodamine-Platinum Diimine Dithiolate Complex Dyads as Efficient and Robust Photosensitizers for Light-Driven Aqueous Proton Reduction to Hydrogen," J. Am. Chem. Soc. (2018), 140, pp. 2575-2586.

Li et al., "Rhodol Derivatives as Selective Fluorescent Probes for the Detection of HgII Ions and the Bioimaging of Hypochlorous Acid," ChemistryOpen (2018), 7, pp. 136-143.

McGuire Jr. et al., "Platinum (II) polypyridines: A tale of two axes," Coordination Chemistry Reviews, ( 2010), 254, pp. 2574-2583.

Po et al., "Supramolecular self-assembly of amphiphilic anionic platinum (II) complexes: A correlation between spectroscopic and morphological properties," J. Am. Chem. Soc. (2011), 133, pp. 12136-12143.

Wang et al., "Introduction of luminescent rhenium(I), ruthenium(II), iridium(III) and rhodium(III) systems into rhodamine-tethered ligands for the construction of bichromophoric chemosensors." Dalton Transactions, vol. 44, No. 34, Apr. 22, 2015 (Apr. 22, 2015), pp. 15250-15263.

International Search Report and Written Opinion for Application No. PCT/CN2018/086319 dated Jan. 17, 2019.

* cited by examiner

ALKYNYLPLATINUM (II) TERPYRIDINE SYSTEM COUPLED WITH RHODAMINE DERIVATIVE: INTERPLAY OF AGGREGATION, DE-AGGREGATION AND RING-OPENING PROCESSES FOR RATIOMETRIC LUMINESCENCE SENSING

TECHNICAL FIELD

The invention relates to fluorescent sensing field. More particularly, a hybrid compound from the combination of a platinum(II) terpyridine system and a latent organic dye of rhodamine derivative has been designed to show the interplay of aggregation, de-aggregation and ring-opening processes for ratiometric fluorescent sensing.

BACKGROUND

Square-planar platinum(II) polypyridine complexes have attracted wide attention due to their interesting spectroscopic and luminescence properties, in particular of those with short Pt . . . Pt and π-π contacts.[1-6] Apart from the basic photophysical studies, other research groups have also focused on their versatile potential applications in material and biological science.[7-9] Yam, Wong and coworkers have pioneered a work on the alkynylplatinum(II) terpyridine complexes. Drastic colour change and "switching on" of near infrared (NIR) photoluminescence properties of them, associated with the non-covalent Pt . . . Pt and π-π interactions upon aggregation in solution state, have been reported.[5a] Modulation of such aggregate formation with some examples of micelle formation and metallogel formation, could be achieved by changing solvent composition, temperature and addition of anionic polyelectrolytes.[5] Further exploration of immobilization-free detection concepts involving the intriguing NIR spectroscopic response for various biologically relevant substrates have also been studied by introduction of sensing and orienting functional groups into the system.[6]

By controlling the ring closure and opening of the spiro-ring, the two structural isomers of rhodamine derivatives could provide very distinguished optical behaviors.[10] Structural modifications on the spirolactam group could embark highly selective and sensitive binding properties into the rhodamine derivatives for corresponding molecular fluorescence probes.[11,12] Although there are a few reports on the combination of the rhodamine unit with another organic chromophore or luminophore in a single molecule, the related construction of bichromophoric array by the incorporation of a luminescent transition metal complex into a rhodamine derivative with sensory functionality is relatively unexplored.[8d,13] Our group has recently developed a novel bichromophoric chemosensimg system with hybridization of organic rhodamine derivative dye and luminescent cyclometalated iridium(III) complex.[14a] The highly selective and sensitive sensory advantages from rhodamine derivatives and phosphorescence characteristics of iridium(III) luminophore with large stoke shift and long luminescence lifetime could be retained in such hybrid system. Other rhodamine-containing luminescent transition metal complexes of Re(I), Rh(III) and Ir(III)[14b,c] and new types of rhodamine derivatives[15] have also been explored. On the other hand, the combination of another fluorophores into rhodamine derivative to achieve ratiometric luminescence probes has been reported.[12] Ratiometric luminescence monitoring provide a higher selective and sensitive detection method because the ratio of fluorescent intensities at two wavelengths is independent on the intensity of light source, concentration of the probe and sensitivity of instrument.

SUMMARY

To continue our great interest in combination of superior photophysical merits of transition metal complexes and the binding abilities of rhodamine derivatives, we herein report the synthesis of a series of platinum(II) terpyridine complexes, with rhodamine derivative tethered to the terpyridine ligand; for example, [(L)PtCl]$^+$ClO4$^-$ (complex 1, Formula I) and [(L)Pt(C≡CPh)]$^+$ClO4$^-$ (complex 2, Formula II). Selective Hg$^{2+}$ ion sensing behavior showing spectroscopic responses have been observed. The corresponding morphological changes of the alkynylplatinum(II) complex 2 have also been investigated and correlated with the aggregation, de-aggregation and ring-opening processes. Interestingly, aggregation emission of 2 at NIR region renders ratiometric luminescence measurement in such hybrid possible. The present study, as the first example, explores the effect of selective and sensitive sensory ring opening or closing process of rhodamine derivative with an involvement of the aggregation behaviors of alkynylplatinum(II) terpyridine system.

The invention in the first aspect provides a complex from the combination of a platinum(II) terpyridine system and a rhodamine derivative, used for ratiometric fluorescent sensing in the presence of Hg$^{2+}$.

The invention in the second aspect provides a complex from the combination of a platinum(II) terpyridine system and a rhodamine derivative, used as a selective Hg2+ probe.

In preferred embodiments, the complex of the invention has the structure of formula II.

The invention in the third aspect provides a preparation method for a complex having a structure of Formula II, where the intermediate product is a complex having a structure of formula I.

The invention further provides a complex having a structure of Formula II showing spiroring-opening process with Hg$^{2+}$.

The invention further provides a complex having a structure of Formula II showing de-aggregation process with Hg$^{2+}$.

The complex may be used for indicating UV-Vis absorption and emission spectral changes at the same time.

Use of the complex in Ratiometric luminescence sensing for selective detection of $Hg^{2+}$ is also provided.

DETAILED DESCRIPTION

Examples

1. Materials and Reagents

All the solvents for synthesis were of analytical grade. Methanol for analysis was of spectroscopy grade. Rhodamine B base and phosphorus oxychloride were purchased from the Acros Organics Company. 2-Pyridinecarboxaldehyde, barium(II) perchlorate (RG grade) and bis(dimethyl sulfoxide)platinum(II) chloride were purchased from the Sigma-Aldrich Chemical Company. Silver triflate was purchased from the Energy Chemical Company. Copper(II) perchlorate, sodium(I) perchlorate, lead(II) perchlorate trihydrate, cadmium(II) perchlorate hexahydrate, lithium(I) perchlorate, magnesium(II) perchlorate, cobalt(II) perchlorate were purchased from Alfa Aesar with RG grade. Zinc (II) perchlorate hexahydrate (RG grade) was purchased from Aladdin Chemical Co., Ltd. Nickel(II) perchlorate hexahydrate, calcium(II) perchlorate tetrahydrate, mercury(II) perchlorate trihydrate were purchased from Strem Chemicals, Inc. with over 99.0% purity.

Safety precaution: Mercury(II) salt is hazard to health. Perchlorate salts of metal ion are potentially explosive. Both of them should be handled with care.

2. Instruments

NMR spectra were recorded on a Bruker AVANCE 400 ($^1H$ NMR for 400 MHz) Fourier-transform NMR spectrometer and a Bruker AVANCE 500 ($^1H$ NMR for 500 MHz) Fourier-transform NMR spectrometer with chemical shifts reported relative to tetramethylsilane, $(CH_3)_4Si$. The UV-visible absorption spectra were taken on Cary 60 UV-vis spectrophotometer. Steady state emission spectra at room temperature were recorded on an Edinburgh Instruments FLS980 Fluorescence Spectrometer. Quartz cuvettes (pathlength=1 cm) was used in all spectrophotometric and fluorometric measurements. High resolution mass spectra were performed on ORBITRAP FUSION™ TRIBRID™ Mass spectroscopy. Infrared spectrum as KBr disk was collected from a SHIMAZU IRPrestige-21 Fourier Transform Infrared Spectrophotometer. SEM images were recorded on a ZEISS Merlin scanning electron microscope operated at 5 kV. TEM images were recorded on a Tecnai F30 microscope operated at 300 kV. Elemental analyses of complexes were performed on an Elementar Vario EL cube elemental analyzer at Analytical and Testing Center of Sun Yat-Sen University.

3. Method

1) For Ion-Binding Studies

Binding constants for 1:1 complexation were determined by nonlinear least-squares fits to equation (1).

$$X = X_0 + \frac{X_{lim} - X_0}{2[M]_T} \{[M]_T + [Hg^{2+}] + 1/K_S - \\ [([M]_T + [Hg^{2+}] + 1/K_S)^2 - 4[M]_T[Hg^{2+}]]^{1/2}\} \quad (1)$$

where $X_0$ and $X$ are the absorbance (or luminescence intensity) of RhOH at a selected wavelength in the absence and presence of the Hg(II) ion, respectively, $[M]_T$ is the total concentration of RhOH, $[Hg^{2+}]$ is the concentration of the Hg(II) ion, $X_{lim}$ is the limiting value of absorbance (or luminescence intensity) in the presence of excess Hg(II) ion and $K_s$ is the stability constant.

2) For X-Ray Crystallography

Single crystals of L suitable for X-ray diffraction studies were grown by slow vapour diffusion of diethyl ether into dichloromethane solution of L. Single-crystal X-ray diffraction analysis of L was performed on a Bruker APEX-II CCD diffractometer with graphite-monochromated Mo-Kα radiation (λ=0.71073 Å) at room temperature. All absorption corrections were performed using multi-scan. The structure was solved by direct methods and refined by full-matrix least-squares on F² with the SHELXTL-97 program package. 17 CCDC-1824688 contains the supplementary crystallographic data for this paper. These data can be obtained free of charge from The Cambridge Crystallographic Data Centre via www.ccdc.cam.ac.uk/.

4. Synthesis

1) To a solution of bis(dimethyl sulfoxide)platinum(II) chloride (0.158 g, 0.381 mmol) in acetone (30 mL), a solution of silver triflate (0.108 g, 0.420 mmol) in acetone (30 mL) was added dropwise. The reaction mixture was then allowed to stir at room temperature for 45 minutes. The mixture was filtered, and the precipitate was washed with acetone (5 mL). To the filtrate a solution of L (0.300 g, 0.401 mmol) in mixed solvent of acetone/acetonitrile/methanol (150 mL, 1:2:2) was added, and the resulting solution was allowed to stir at room temperature overnight. Bright red solution formed with a small amount of precipitate, which was filtered by sintered-glass filter funnel. The filtrate was evaporated under reduced pressure to give the crude product as dark red solid. To a solution of the crude product (0.100 g, 0.089 mmol) in methanol (100 mL), lithium(I) perchlorate (0.015 g, 0.141 mmol) was added. After stirring at room temperature for 30 minutes, dark red precipitate formed. The precipitate was collected by filtration to give the crude product of 1. Subsequent recrystallization by diffusion of diethyl ether into an acetonitrile solution of crude product gave 1 as red solid.

$^1$H NMR (400 MHz, CD$_3$CN, 298K, relative to Me$_4$Si, δ/ppm): 8.66 (d, J=3.3 Hz, 2H, terpyridyl H), 8.25-8.09 (m, 6H, terpyridyl H), 7.97 (d, J=7.0 Hz, 1H, spiro-ring H), 7.74 (d, J=8.2 Hz, 2H, phenyl H), 7.68-7.53 (m, 4H, terpyridyl H and spiro-ring H), 7.37 (d, J=8.4 Hz, 2H, phenyl H), 7.08 (d, J=7.1 Hz, 1H, spiro-ring H), 6.71 (d, J=8.8 Hz, 2H, xanthyl H), 6.40 (dd, J=9.0, 2.3 Hz, 2H, xanthyl H), 6.37 (d, J=2.2 Hz, 2H, xanthyl H), 3.33 (q, J=6.9 Hz, 8H, —CH$_2$—), 1.10 (t, J=6.8 Hz, 12H, —CH$_3$). HRMS (ESI) for C$_{49}$H$_{44}$ClN$_6$O$_2$Pt [M]$^+$: calcd 979.2862, Found 979.2856. Elemental analysis calcd (%) for C$_{49}$H$_{44}$Cl$_2$N$_6$O$_6$Pt.CH$_2$Cl$_2$.2H$_2$O: C, 50.05; H, 4.20; N, 7.00. found: C, 49.76; H, 4.04; N, 6.98.

2) To a mixture of 1 (0.100 g, 0.089 mmol) and cuprous iodide (0.003 g, 0.016 mmol), degassed DMF (5 mL), Et$_3$N (1.2 mL) and phenylacetylene (0.013 g, 0.127 mmol) were added in sequence. The resultant dark red mixture was allowed to stir at room temperature overnight. The solution was stirrer for further 10 minutes after the subsequent addition of diethyl ether (20 mL). The red precipitate formed was filtered and washed by diethyl ether (5 mL). Redissolve the precipitate in heated methanol (150 mL), followed by filtration gave a clear solution. To the solution lithium(I) perchlorate (0.015 g, 0.141 mmol) was added, and the mixture was stirred in icy water bath for 15 minutes. The precipitate was collected by filtration to give the crude product. Subsequent recrystallization by diffusion of diethyl ether into an acetonitrile solution of crude product gave 2 as black solid. Yield: 55.9%.

$^1$H NMR (500 MHz, CD$_3$CN, 298K, relative to Me$_4$Si, δ/ppm): 8.39 (d, J=3.1 Hz, 2H, terpyridyl H), 8.06 (t, J=7.4 Hz, 2H, terpyridyl H), 8.00 (s, 2H, terpyridyl H), 7.97 (d, J=7.5 Hz, 3H, terpyridyl H and spiro-ring H), 7.63 (t, J=7.0 Hz, 1H, spiro-ring H), 7.59 (t, J=7.2 Hz, 1H, spiro-ring H), 7.37-7.30 (m, 4H, phenyl H and phenylacetenyl H), 7.26 (d, J=8.5 Hz, 2H, phenyl H), 7.09 (d, J=7.4 Hz, 1H, spiro-ring H), 7.05 (d, J=5.9 Hz, 3H, phenylacetenyl H), 6.99 (t, J=7.2 Hz, 2H, terpyridyl H), 6.73 (d, J=8.9 Hz, 2H, xanthyl H), 6.45 (dd, J=9.0, 2.4 Hz, 2H, xanthyl H), 6.43 (d, J=2.3 Hz, 2H, xanthyl H), 3.38 (q, J=6.9 Hz, 8H, —CH$_2$—), 1.14 (t, J=6.9 Hz, 12H, —CH$_3$). IR (KBr disk, v/cm$^{-1}$): 2115(m), ν(C≡C). HRMS (ESI) for C$_{57}$H$_{49}$N$_6$O$_2$Pt [M]$^+$: calcd 1044.3563, Found 1044.3561. Elemental analysis calcd (%) for C$_{57}$H$_{49}$ClN$_6$O$_6$Pt.3H$_2$O: C, 57.12; H, 4.63; N, 7.01. found: C, 57.14; H, 4.43; N, 6.85.

5. Characterizations

Figure 1:
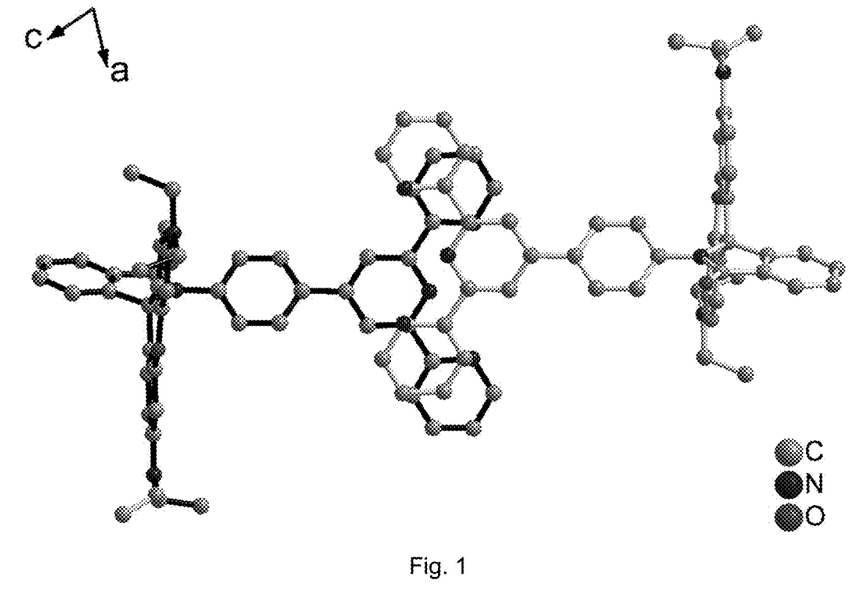
FIG. 1 shows a ball-and-stick model showing the dimeric packing of L, with head-to-tail arrangement and π-π stacking between two terpyridine moieties, from the view along the b-axis.
Figure 9:
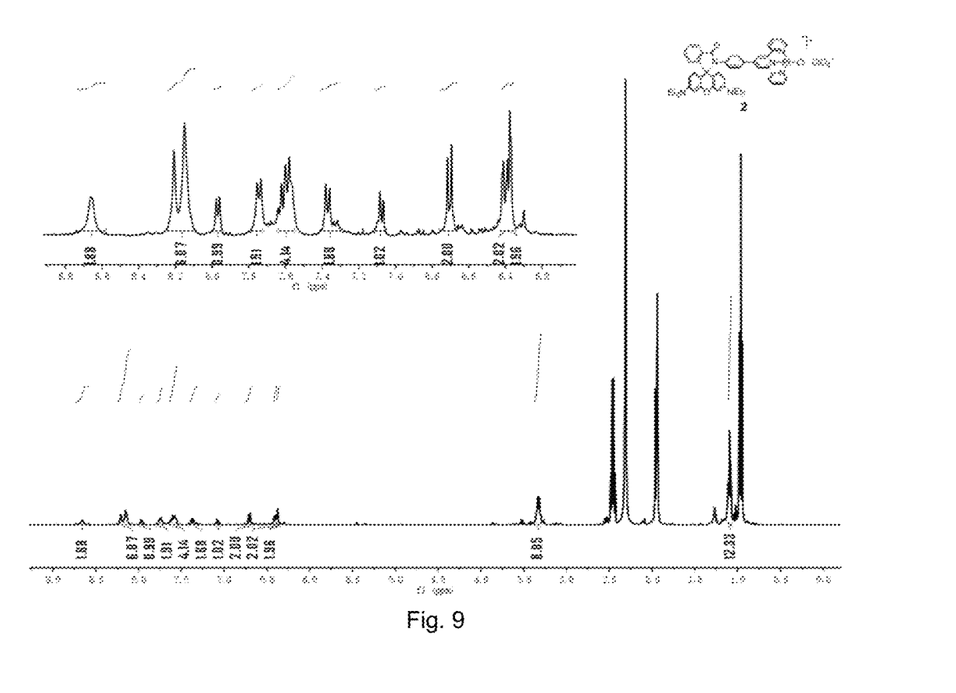
FIG. 9 shows $^1H$ NMR spectrum of 1 in $CD_3CN$.
Figure 10:
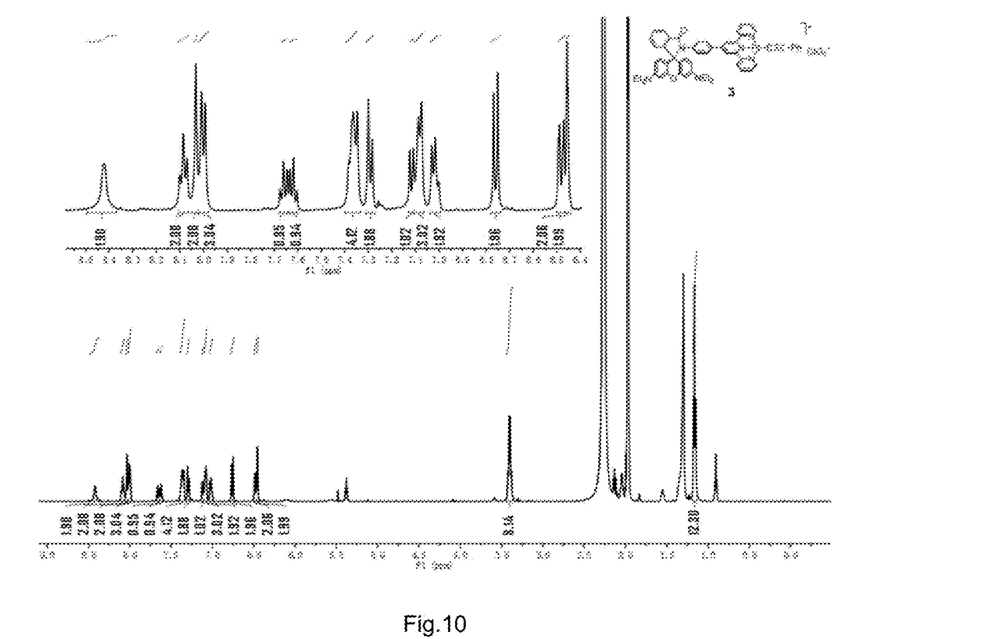
FIG. 10 shows $^1H$ NMR spectrum of 2 in $CD_3CN$.
Figure 11:
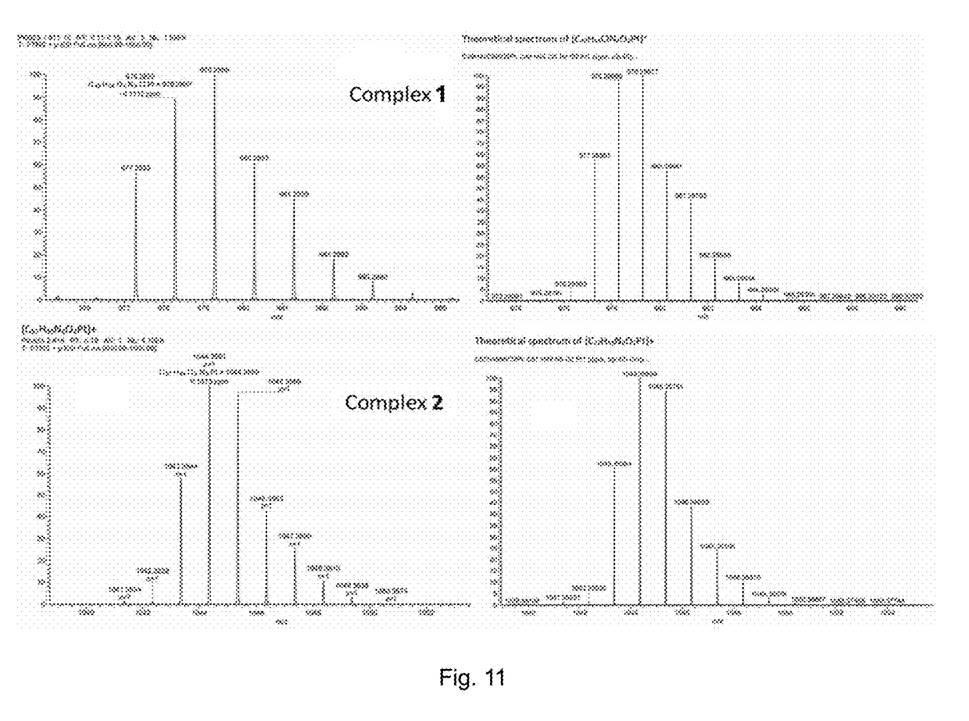
FIG. 11 shows high-resolution mass spectra (left) and the corresponding simulated isotope patterns (right) of 1 and 2.
Figure 12:
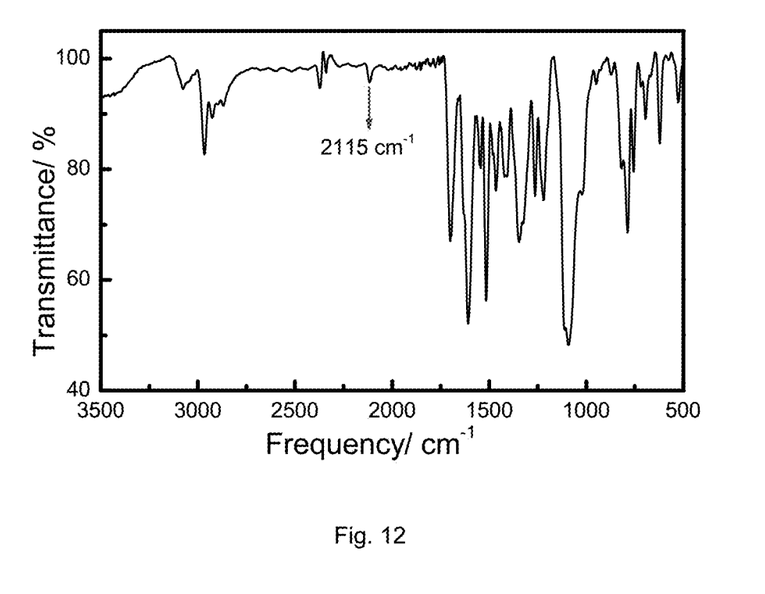
FIG. 12 shows solid state IR spectrum of 2 in KBr showing v(C≡C) stretching.
Figure 13:
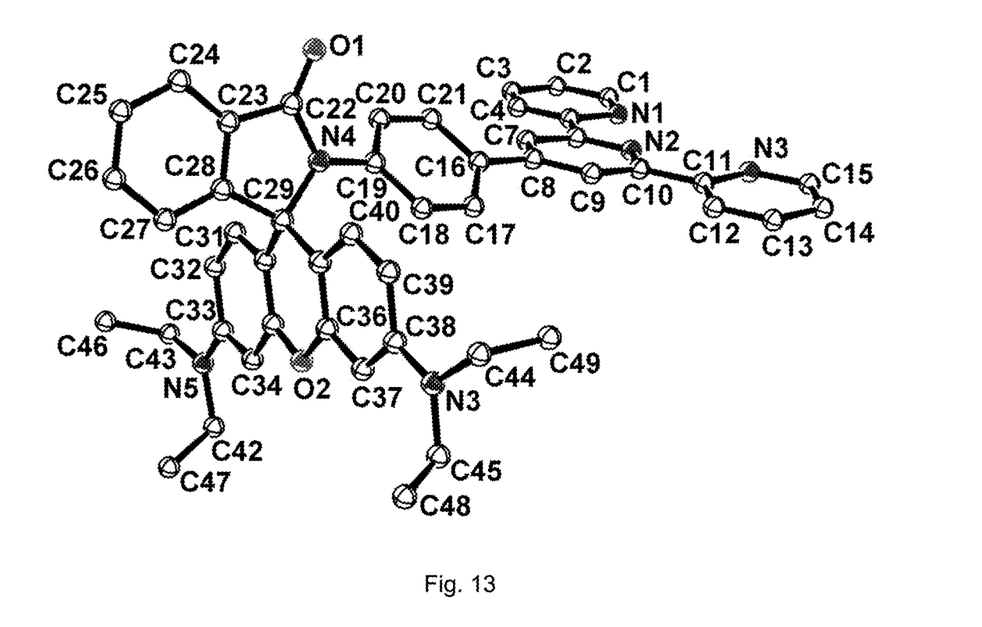
FIG. 13 shows perspective drawing of L with atomic numbering scheme. Hydrogen atoms and solvent molecules are omitted for clarity. Thermal ellipsoids are drawn at the 35% probability level.

Complexes 1 and 2 were fully characterized by $^1$H NMR, elemental analyses and positive-ion ESI high resolution mass spectrometry (FIG. 9-11). IR spectrum of 2 (FIG. 12) showed an absorption peak at 2115 cm$^{-1}$, assignable of the ν(C≡C) stretching. The molecular structure of L was determined by X-ray crystallography and the experimental details are given in Table 1. The perspective drawing is shown in FIG. 9 and the selected bond distances (Å) and angles (deg) are tabulated in Table 2. The molecule reveals that the rhodamine derivative moiety is in a spiro-ring closure structure at the spiro carbon C(29). The bond length of N(4)-C(29) (1.501 Å) and bond angle of N(4)-C(29)-C(28) (99.9°) are within normal range of those in other rhodamine derivatives. The xanthenes and isoindolin-1-one planes are orthogonal with the interplanar angle of 87.0°. The crystal packing diagram (FIG. 1) shows that two molecules of L arranges in a dimeric form with a head-to-tail conformation. The shortest distance between two ideally parallel terpyridine planes are 3.42 Å, which indicates the presence of π-π interaction.

TABLE 1

| Crystal and structure determination data of L | |
|---|---|
| | L |
| Empirical formula | C$_{49}$H$_{48}$N$_6$O$_4$ |
| Formula weight | 784.93 |
| Temperature, K | 296(2) |
| Wavelength, Å | 0.71073 |

TABLE 1-continued

Crystal and structure determination data of L

| | L |
|---|---|
| Crystal system | Triclinic |
| Space group | P$\bar{1}$ |
| a, Å | 12.1473(11) |
| b, Å | 13.7347(13) |
| c, Å | 15.6178(15) |
| α, deg | 67.055(2) |
| β, deg | 70.6740(10) |
| γ, deg | 89.659(2) |
| Volume, Å$^3$ | 2241.5(4) |
| Z | 2 |
| Density (calculated), g cm$^{-3}$ | 1.163 |
| Crystal size, mm × mm × mm | 0.30 × 0.20 × 0.10 |
| Index ranges | −13 ≤ h ≤ 14 |
| | −16 ≤ k ≤ 9 |
| | −18 ≤ l ≤ 18 |
| Reflections collected/unique | 11600/8048 |
| | [R(int) = 0.0164] |
| Completeness, % | 98.9 (to theta =25.24°) |
| Data/restraints/parameters | 8048/0/537 |
| Goodness-of-fit on F$^2$ | 1.258 |
| Final R indices[a] | R$_1$ = 0.0907 |
| [I > 2σ(I)] | wR$_2$ = 0.2933 |
| Largest diff. peak and hole, eÅ$^{-3}$ | 0.970 and −0.389 |

[a] $R_{int} = \Sigma|F_o^2 - F_o^2(\text{mean})|/\Sigma[F_o^2]$, $R_1 = \Sigma||F_o| - |F_c||/\Sigma|F_o|$ and $wR_2 = \{\Sigma[w(F_o^2 - F_c^2)^2]/\Sigma[w(F_o^2)^2]\}^{1/2}$.

TABLE 2

Selected bond lengths (Å) and angles (deg) for L with estimated standard deviations (esds) given in parentheses

| Bond Lengths (Å) | | Bond Angles (deg) | |
|---|---|---|---|
| N(4)—C(19) | 1.427(3) | C(19)—N(4)—C(22) | 122.9(2) |
| N(4)—C(22) | 1.382(4) | C(22)—N(4)—C(29) | 113.4(2) |
| N(4)—C(29) | 1.501(4) | C(19)—N(4)—C(29) | 123.6(2) |
| C(22)—C(23) | 1.481(4) | N(4)—C(29)—C(28) | 99.9(2) |
| C(28)—C(29) | 1.526(4) | N(4)—C(29)—C(41) | 111.6(2) |
| C(29)—C(30) | 1.508(4) | C(30)—C(29)—C(41) | 110.2(2) |
| C(29)—C(41) | 1.519(4) | | |

6. Basic Photophysical Properties

Figure 14:
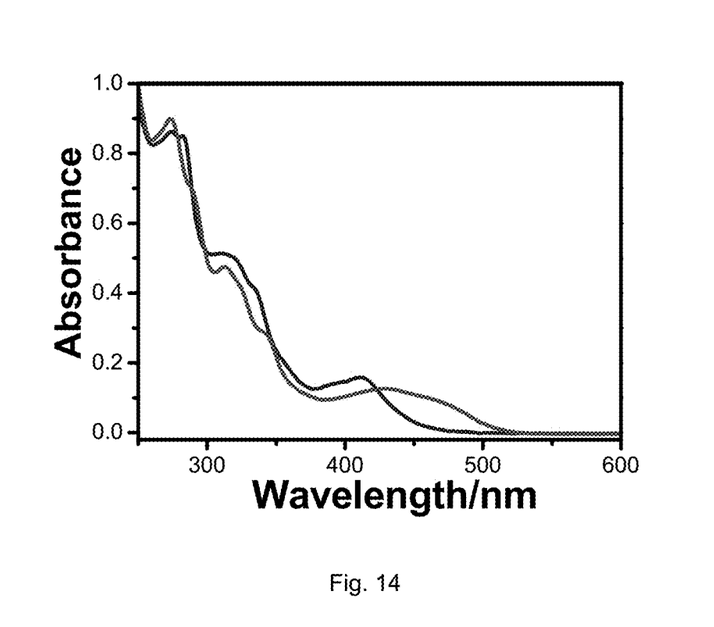
FIG. 14 shows electronic absorption spectra of 1 (blue) and 2 (red) (conc.=2×10$^{-5}$M) in methanol.
Figure 15:
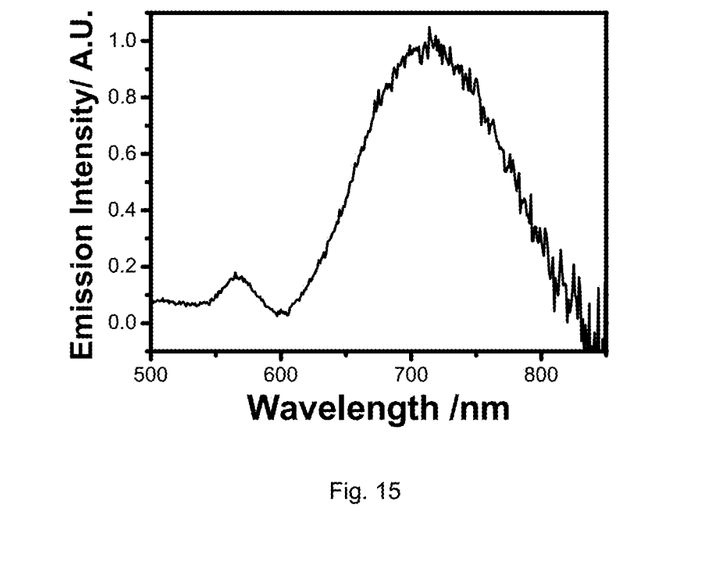
FIG. 15 shows emission spectrum of 2 in methanol at 298K.

The absence of characteristic rhodamine B absorption band in 1 and 2 was indicative of its ring closed form in their UV-Vis absorption spectra in methanol (FIG. 14). The high-energy absorption band at 270-345 nm is attributed to the n-π* absorption of xanthenes and π-π* absorption of terpyridine. The low-energy absorption band of 1 at 350-420 nm was assigned as the metal-to-ligand charge transfer (MLCT) [dπ(Pt)→*(terpy)] transition, while that of 2 at 440-500 nm was attributed to the admixture of the MLCT [dπ(Pt)→π*(terpy)] transition and the ligand-to-ligand charge transfer (LLCT) [π(C≡C)→*Tr*(terpy)] transition. Similar to other related chloroplatinum(II) terpyridine system, no observable emission in methanol was found in 1. It is noteworthy that a broad NIR emission band at 710 nm, which is attributed to metal-metal-to-ligand charge transfer (MMLCT) excited state, was observed in 2 (FIG. 15), suggesting the existence of aggregate formation in methanol.[5a,b] Although the planes of xanthenes and isoindolin-1-one are in orthogonal conformation, the aggregation is still possible through the Pt—Pt and π-π interactions from the head-to-tail arrangement, as suggested in the crystal packing of ligand.

7. Selectivity Study

Figure 2:
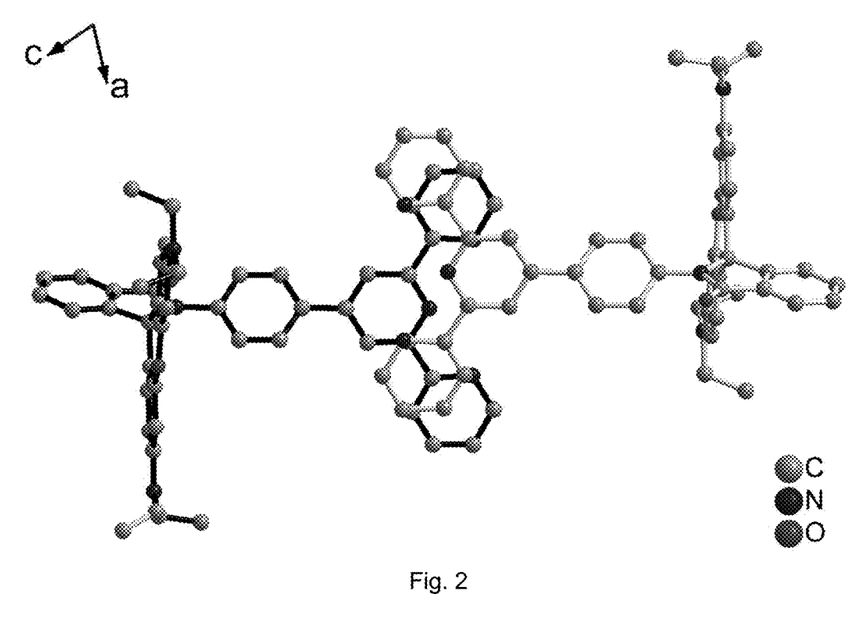
FIG. 2 shows electronic absorption and normalized emission spectra of 1 (blue) and 2 (red) (conc.=2×10-5 M) in methanol with 10 equivalent of Hg2+.
Figure 3:
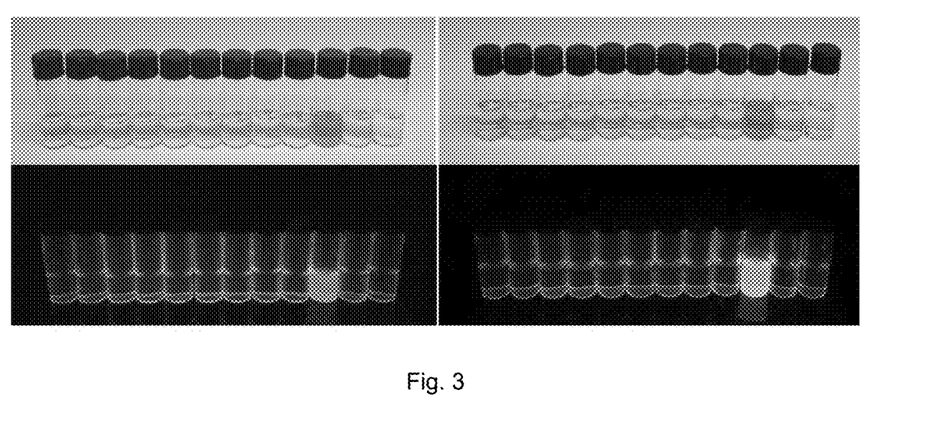
FIG. 3 shows photographs demonstrating the colour changes (top) and fluorescence enhancement (bottom) of 1 (left) and 2 (right) (conc.=2×10-5 M) in methanol with various cations (10 eq.) From left to right: Na+, Zn2+, Pb2+, Ca2+, Li+, Mg2+, Ba2+, Ni2+, Cd2+, Hg2+, Co2+, blank.
Figure 16A:
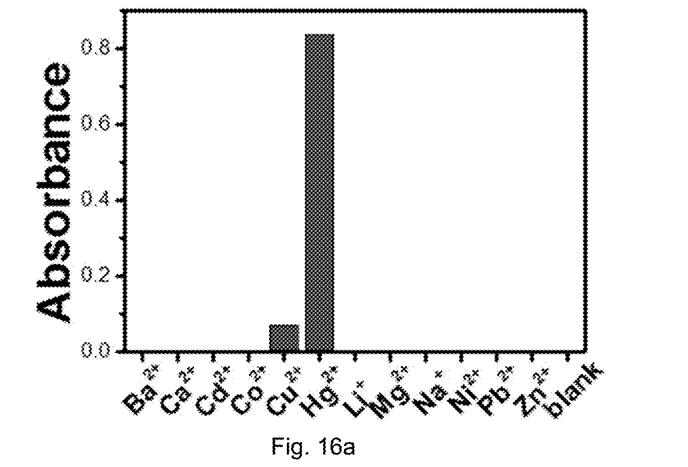
FIG. 16 shows selectivity (a) and interference (b) studies of 2 (conc.=2×10$^{-5}$M) in MeOH upon addition of various metal ions (10 equiv).
Figure 16B:
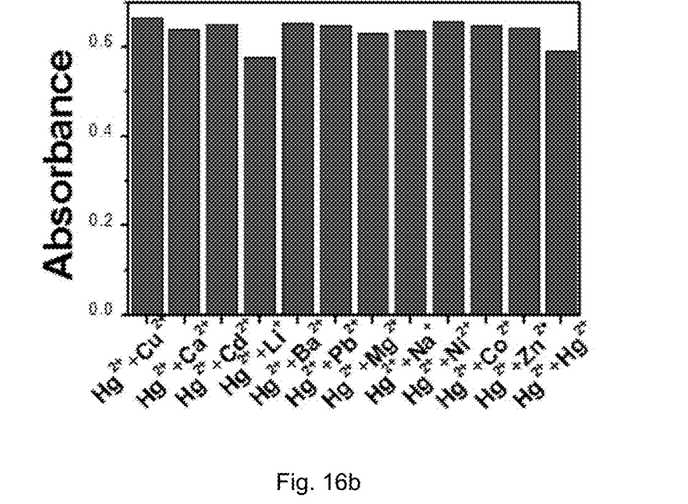

Spectroscopic responses of the rhodamine moiety through metal cation-triggered ring-opening process in 1 and 2 were tested in methanol. In the presence of Hg$^{2+}$ ion, intense absorption band at 556 nm and emission band at 585 nm were observed in both 1 and 2 (FIG. 2). Such switching "on" absorption and fluorescence were ascribed to the intraligand (IL) [π→π*] transition of xanthene moiety upon ring-opening process of rhodamine derivative in which the spirolactam group was converted into the ring-opened amide. Selectivity study was also performed by monitoring the absorbance at 585 nm in the corresponding solutions containing various ions. Among various alkali, alkaline-earth and transition metal ions, such spectral and colour changes were only observed by Hg$^{2+}$ ion (FIG. 3 and FIG. 16a). It showed that both 1 and 2 are potential selective Hg$^{2+}$ probe. No interference has been found from other metal ions in solution of the probe with Hg$^{2+}$ ion FIG. 16b).

8. Mercury(II) Ion Sensing

Figure 4:
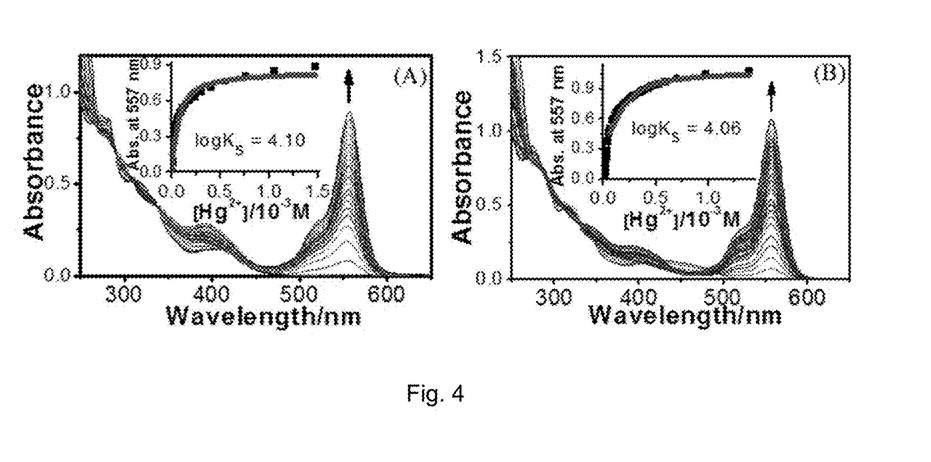
FIG. 4 shows electronic absorption spectral changes of 1 (left) and 2 (right) (conc.=2×10-5 M) upon the addition of [Hg2+] in methanol. Insets: Plots of the corresponding absorbance at 557 nm as a function the concentration of Hg2+ with a theoretical fit.
Figure 5:
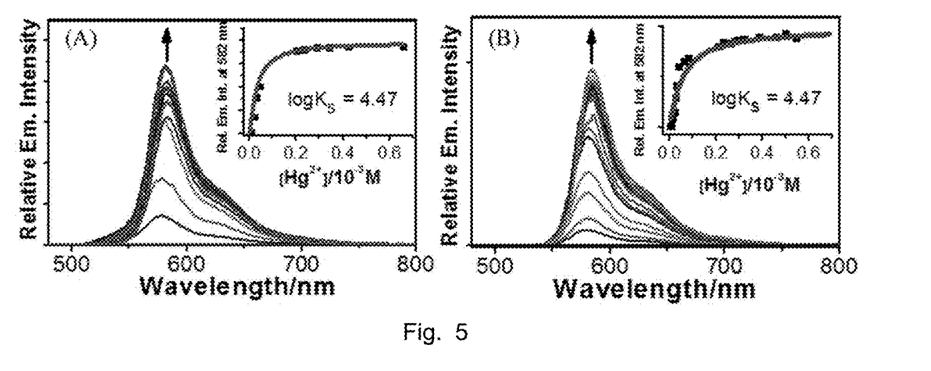
FIG. 5 shows emission spectral changes of 1 (left) and 2 (right) (conc.=2×10-5 M) upon the addition of [Hg2+] in methanol. Insets: Plots of the corresponding relative emission intensity at 582 nm as a function the concentration of Hg2+ with a theoretical fit.
Figure 17:
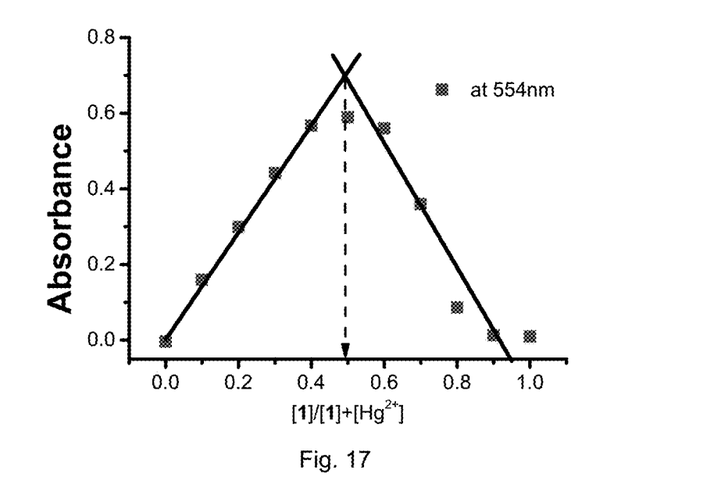
FIG. 17 shows job plots of 1 and $Hg^{2+}$ in MeOH. The total concentration of 1 and $Hg^{2+}$ was kept constant at $10^{-4}$ M.
Figure 18:
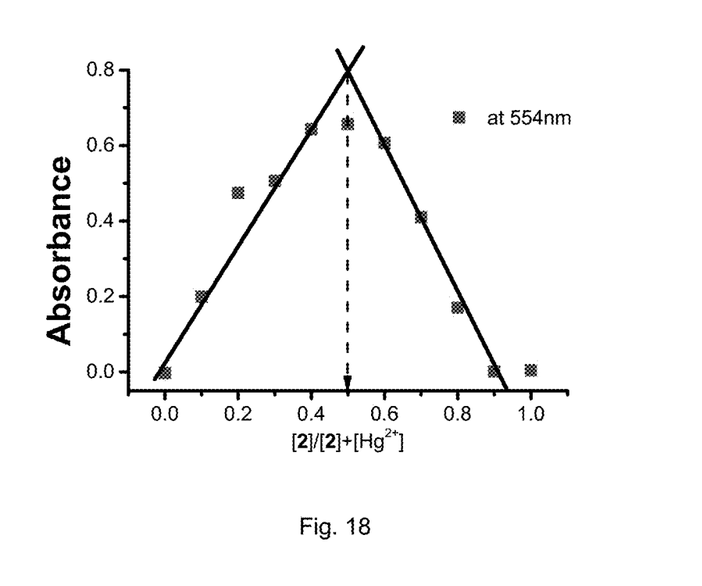
FIG. 18 shows job plots of 2 and $Hg^{2+}$ in MeOH. The total concentration of 2 and $Hg^{2+}$ was kept constant at $10^{-4}$ M.
Figure 19:
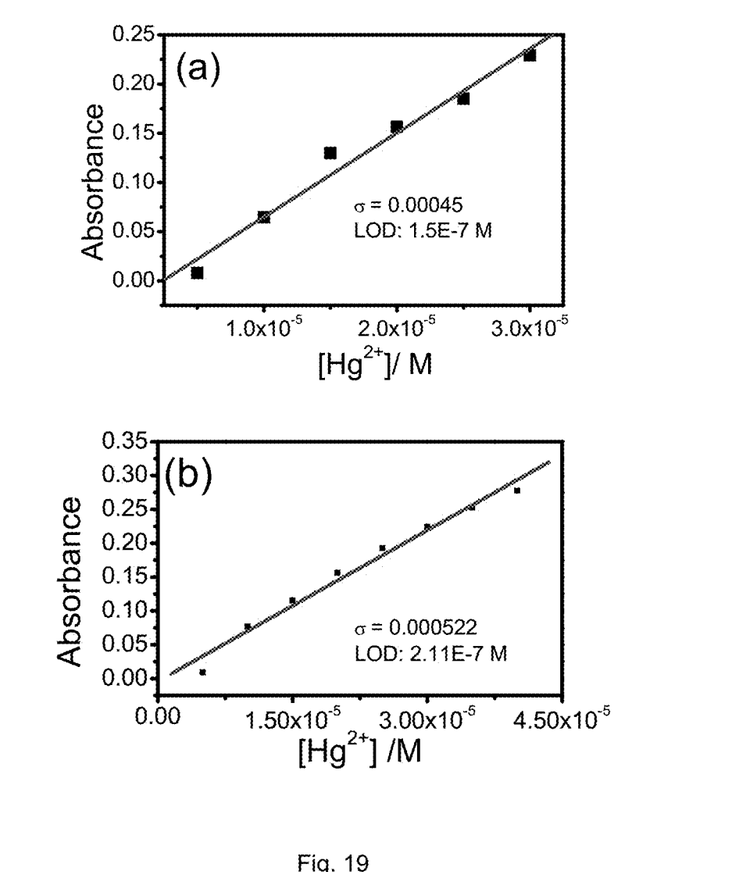
FIG. 19 shows determination of the detection limit in (a) 1 and (b) 2 (conc.=2×10$^{-5}$M) from the electronic absorption titration study in MeOH.
Figure 20:
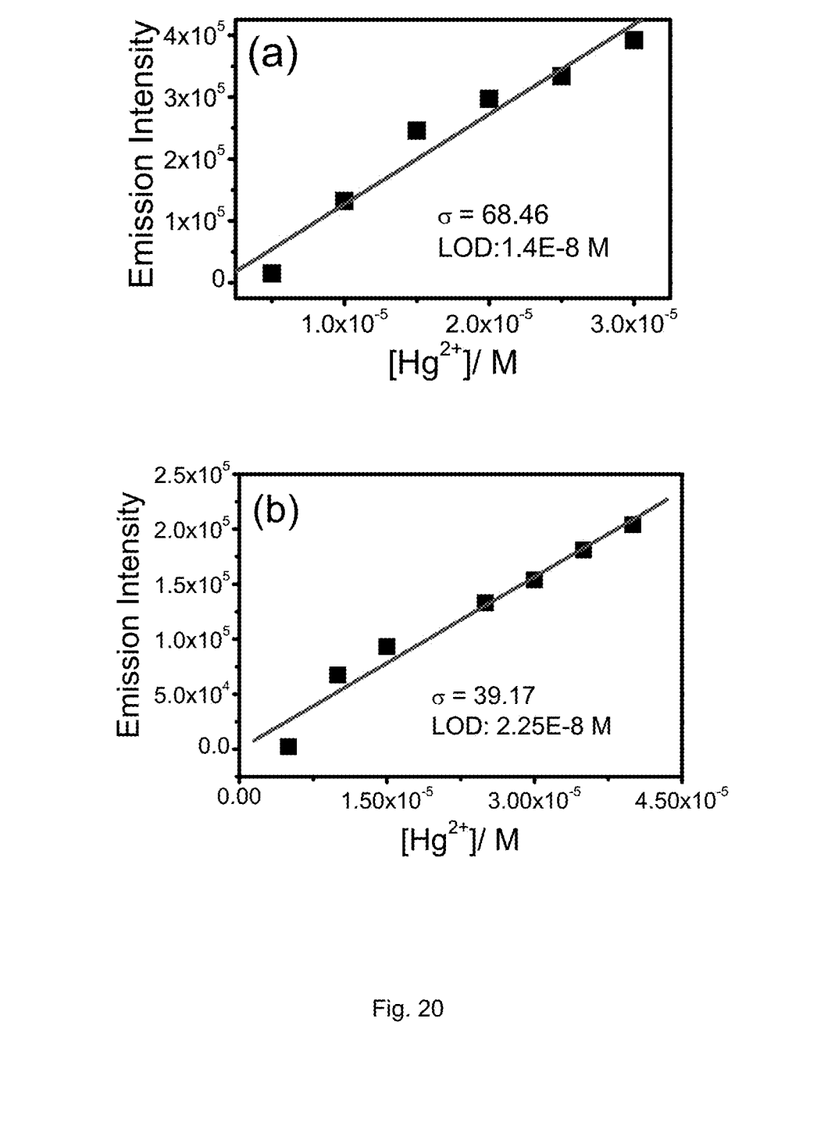
FIG. 20 shows determination of the detection limit in (a) 1 and (b) 2 (conc.=2×10$^{-5}$M) from the emission titration study in MeOH.

Apart from the good selectivity of 1 and 2 toward Hg$^{2+}$ ion, the corresponding sensitivity was also examined by spectroscopic titration studies. The electronic absorption spectral changes of 1 and 2 are shown in FIG. 4. The absorbance at 585 nm was found to increase with the concentration of Hg$^{2+}$ ion, indicative of the spiro-ring opening from rhodamine derivative. The observation of the well-defined isosbestic points at about 330 nm indicates a clean conversion in the equilibrium between the ring-closed spiro-lactam and the ring-opened amide forms. The binding constants (log Ks values) of 1 and 2 for Hg$^{2+}$ were determined from the electronic absorption spectra data to be 4.10 and 4.06, respectively. The similar binding constant of them suggests that the replacement of chloro ligand by an alkynyl group gives negligible effect on the binding affinity. The 1:1 binding mode was independently confirmed by the satisfactory theoretical fitting curve and by the method of continuous variation in which a break point at mole fraction of 0.5 was observed (FIGS. 17 and 18). Limits of detection (LOD) were estimated to be in the range of 1.5-2.1×10$^{-7}$ M for them (FIG. 19). Corresponding emission titration study with Hg$^{2+}$ ion was also performed and their emission spectral changes of 1 and 2 are shown in FIG. 5. Upon addition of Hg$^{2+}$ ion, the characteristic rhodamine B emission at 585 nm was emerged. Relative to those obtained from the absorption titration study, similar binding constants (4.47 and 4.31 for 1 and 2, respectively) were obtained from these emission titration results. This indicates the same origin for the new absorption and emission bands arising from the ring opening process on the spirolactam group. Lower limits of detection in the range of 1.4-2.2×10$^{-8}$ M (FIG. 20) were determined by such emission titration method, suggestive of higher sensitivity than the corresponding UV-Vis absorption study.

Figure 6:
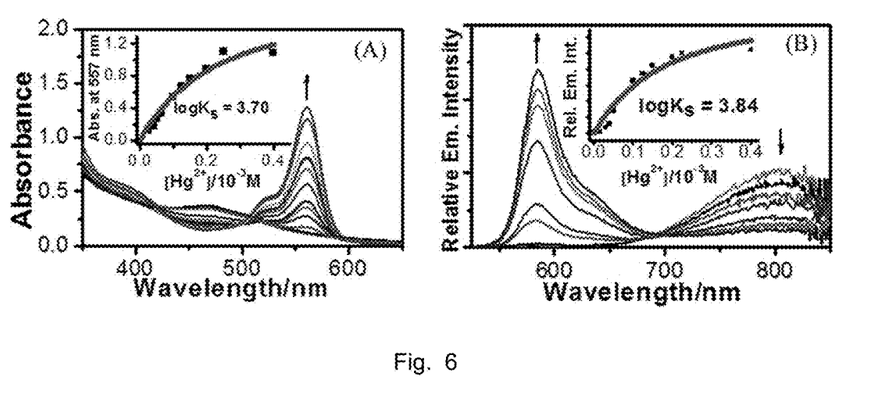
FIG. 6 shows electronic absorption (left) and emission (right) spectral changes of 2 (conc.=5×10-5 M) upon the addition of [Hg2+] in methanol-water (1:1, v/v). Insets: Plots of the corresponding absorbance and emission as a function the concentration of Hg2+ with a theoretical fit.

The introduction of rhodamine derivative with sensory responsive ring-opening ability is anticipated to influence the aggregate formation in the alkynylplatinum(II) terpyridine system, the interrelation between these processes in 2 was investigated. On the other hand, the MMLCT emission from aggregation at about 800 nm is well separated with the rhodamine fluorescence at 585 nm without mutual interference, potentially providing an ideal ratiometric luminescence measurement. Similar to the reported aggregation studies of related alkynylplatinum(II) terpyridine system,[5a,b] solvent induced enhanced aggregate formation of 2 could be obtained in methanol-water (1:1, v/v) solvent mixture. A low-energy absorption shoulder at 530 nm and an intense NIR emission at about 800 nm were accordingly observed (FIG. 6) Upon the addition of $Hg^{2+}$ ion, complex 2 showed a growth of rhodamine absorption band at 560 nm with the diminution of the MMLCT absorption shoulder at 530 nm, as shown in FIG. 3(left). Similar to the absorption titration study, the NIR emission intensity at 800 nm from aggregation decreased dramatically. At the same time, a growth of the rhodamine emission at 585 nm was emerged, resulting from the $Hg^{2+}$ triggered ring-opening process of the rhodamine. The decrease in the NIR emission intensity is ascribed to the de-aggregation of 2, presumably arising from the electrostatic repulsion amongst the highly positive charged $[2.Hg]^{3+}$ adducts. The observation of isoemissive point indicates that the ring-opening process of the rhodamine unit and the de-aggregation of the alkynylplatinum(II) terpyridine moiety occur simultaneously. Binding constants of 3.70 and 3.84 were estimated from the electronic absorption and emission spectral changes, respectively. A striking enhancement factor up to 2500 was obtained by monitoring the change in relative intensity of the emissions at 585 and 800 nm ($I_{585\ nm}/I_{800\ nm}$), illustrating the advantage of ratiometric luminescence measurement.

9. Morphological Studies

Figure 7:
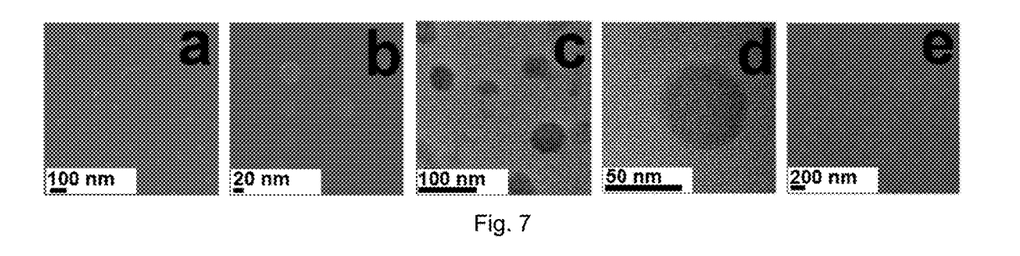
FIG. 7 shows SEM images (a and b) and TEM images (c and d) of 2 (conc.=2×10-5 M) prepared from methanol-water (1:1, v/v) mixture without [Hg2+] and SEM image (e) with 5 equivalent of [Hg2+] on the corresponding substrate after the solvent evaporation. The substrates used are silicon wafer for SEM and carbon-coated copper grids for TEM.
Figure 8:
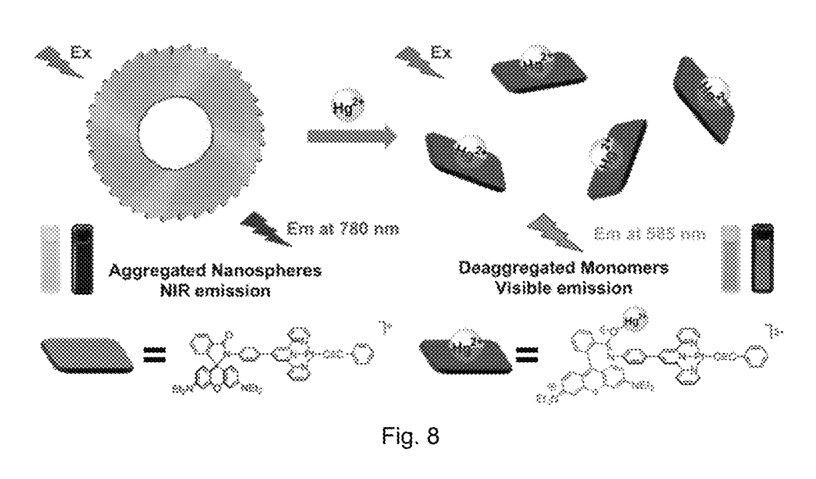
FIG. 8 shows schematic diagram for the ratiometric luminescence of 2 based on solvent-induced aggregation and Hg2+-triggered ring-opening and de-aggregation process in methanol-water (1:1, v/v) mixture.

Scanning electron microscopy (SEM) and transmission electron microscopy (TEM) were employed to investigate the morphology of possible formation of nanosized aggregate of 2. The samples were prepared after the solvent evaporation from the methanol-water (1:1, v/v) mixture of 2 on the substrate of silicon wafer and carbon-coated copper grids for SEM and TEM, respectively. Both the SEM and TEM images show well-defined spherical nano-structures in the range of 30-100 nm in diameter (FIG. 7). Compared to the spherical nano-structures with 200 nm-diameter in the related alkynylplatinum(II) systems,[5d] the formation of smaller nano-spheres in 2 is probably attributed to the steric hindrance and low symmetry of the bulky rhodamine moiety. It is noteworthy that no similar spherical nano-structure could be found in the SEM and TEM images for the samples with 5 eq. of $Hg^{2+}$ ion. Parallel to the spectroscopic results, the absence of nano-structure further confirms the de-aggregation of 2 upon binding of $Hg^{2+}$ ion.

On the basis of the morphological studies, together with the electronic absorption and emission spectral changes, the de-aggregation/aggregation processes of alkynylplatinum(II) terpyridine moiety was correlated with ring-opened/closure form of the rhodamine derivative in 2 and schematically illustrated in FIG. 2. Spherical nano-structures from the aggregation of 2 were formed without $Hg^{2+}$ ion, with emergency of low-energy absorption shoulder at 530 nm and NIR emission at 800 nm. Upon binding with $Hg^{2+}$ ion leading to the ring opening on rhodamine spiroring, characteristic rhodamine absorption at 560 nm and emission 585 nm appeared. At the same time, diminution of the NIR emission at 800 nm was observed, resulting of de-aggregation process on the alkynylplatinum(II) terpyridine unit.

10. Conclusion

To conclude, a hybrid compound from the combination of a platinum(II) terpyridine system and a latent organic dye of rhodamine derivative as colorimetric and fluorescent sensory moiety, has been designed and synthesized. The interplay of aggregation/de-aggregation behavior of the alkynylplatinum(II) terpyridine complex and the ring-opening process of rhodamine derivative has been investigated. We have demonstrated the controllable aggregation process through solvent-induced aggregation and deaggregation based on the intermolecular Pt . . . Pt as well as π-π interactions and $Hg^{2+}$-induced ring-opening process of rhodamine moiety, respectively. The spectral change of aggregation NIR emission at 800 nm and rhodamine fluorescence at 585 nm provides a possible ratiometric luminescence measurement. Morphological studies from TEM and SEM images showing nanospherical structures confirmed the aggregation in the absence of $Hg^{2+}$ ion. We have demonstrated the controllable supramolecular self-assembly process through aggregation/de-aggregation processes and $Hg^{2+}$-induced ring-opening process of rhodamine moiety, respectively.

REFERENCES 1 (a) Miskowski, V. M.; Houlding, V. H. Electronic spectra and photophysics of platinum(II) complexes with α-diimine ligands. Solid-state effects. 1. Monomers and ligand π dimmers. *Inorg. Chem.* 1989, 28, 1529-1533. (b) Miskowski, V. M; Houlding, V. H. Electronic spectra and photophysics of platinum(II) complexes with α-diimine ligands solid-state effects. 2. Metal-metal interaction in double salts and linear chains. *Inorg. Chem.* 1991, 30, 4446-4452. (c) Houlding, V. H.; Miskowski, V. M. *The effect of linear chain structure on the electronic structure of Pt (II) diimine complexes. Coord. Chem. Rev.* 1991, 111, 145-152. (d) Bailey, J. A.; G. Hill, M.; Marsh, R. E.; Miskowski, V. M.; Schaefer W. P.; Gray, H. B. Electronic Spectroscopy of Chloro(terpyridine)platinum(II). *Inorg. Chem.* 1995, 34, 4591-4599. (e) Connick, W. B.; Marsh, R. E.; Schaefer W. P.; Gray, H. B. Spectroelectrochemistry and dimerization equilibria of chloro (terpyridine) platinum (II). Nature of the reduced complexes. *Inorg. Chem.* 1996, 35, 4585-4590. (f) Connick, W. B.; Marsh, R. E.; Schaefer, W. P.; Gray, H. B. Linear-chain structures of platinum (II) diimine complexes. *Inorg. Chem.* 1997, 36, 913-922.

2 (a) Yip, H. K.; Cheng, L. K.; Cheung, K. K.; Che, C. M. Luminescent platinum(II) complexes. Electronic spectroscopy of platinum(II) complexes of 2,2':6',2"-terpyridine (terpy) and p-substituted phenylterpyridines and crystal structure of [Pt(terpy)Cl][$CF_3SO_3$]. *J. Chem. Soc. Dalton Trans.* 1993, 2933-2938. (b) Chan, C. W.; Cheng, L. K.; Che, C. M.; Luminescent donor-acceptor platinum (II) complexes. *Coord. Chem. Rev.* 1994, 132, 87-97. (c) Lai, S. W; Che, C. M. Luminescent cyclometalated diimine platinum (II) complexes: Photophysical studies and applications. *Top. Curr. Chem.* 2004, 241, 27-63. (d) Kui, S. C. F.; Law, Y. C.; Tong, G. S. M. Lu, W.; Yuen, M. Y.; Che, C. M. Spectacular luminescent behaviour of tandem terpyridyl platinum(II) acetylide complexes attributed to solvent effect on ordering of excited states, "ion-pair" formation and molecular conformations. *Chem. Sci.* 2011, 2, 221-228.

3 (a) Paw, W; Cummings, S. D.; Mansour, M. A.; Connick, W. B.; Geiger, D. K.; Eisenberg, R. *Luminescent platinum complexes: tuning and using the excited state. Coord. Chem. Rev.* 1998, 171, 125-150. (b) Connick, W. B.; Geiger, D.; Eisenberg, R. Excited-State Self-Quenching Reactions of Square Planar Platinum(II) Diimine Complexes in Room-Temperature Fluid Solution. *Inorg. Chem.* 1999, 38, 3264-3265. (c) Hissler, M.; McGarrah, J. E.; Connick, W. B.; Geiger, D. K.; Cummings, S. D.; Eisenberg, R. Platinum diimine complexes: towards a molecular photochemical device. *Coord. Chem. Rev.* 2000, 208, 115-137. (d) Wadas, T. J.; Wang, Q. M.; Kim, Y. J.; Flaschenreim, C.; Blanton, T. N.; Eisenberg, R. Vapochromism and its structural basis in a luminescent Pt (II) terpyridine-nicotinamide complex. *J. Am. Chem. Soc.* 2004, 126, 16841-16849.

4 (a) Whittle, C. Ed; Weinstein, J. A.; George, M. W.; Schanze, K. S. Photophysics of diimine platinum (II) bis-acetylide complexes. *Inorg. Chem.* 2001, 40, 4053-4062. (b) Castellano, F. N.; Pomestchenko, I. E.; Shikhova, E.; Hua, F.; Muro, M. L.; Rajapakse, N. Photophysics in bipyridyl and terpyridyl platinum (II) acetylides. *Coord. Chem. Rev.* 2006, 250, 1819-1828. (c) Williams, J. A. G. Photochemistry and photophysics of coordination compounds: platinum. *Top. Curr. Chem.* 2007, 281, 205-268.

5 (a) Wong, K. M. C.; Yam, V. W. W. Self-Assembly of Luminescent Alkynylplatinum(II) Terpyridyl Complexes: Modulation of Photophysical Properties through Aggregation Behavior. *Acc. Chem. Res.* 2011, 44, 424-434. (b) Yam, V. W. W.; Wong, K. M. C.; Zhu, N. Solvent-Induced Aggregation through Metal . . . Metal/π . . . π Interactions: Large Solvatochromism of Luminescent Organoplatinum (II) Terpyridyl Complexes. *J. Am. Chem. Soc.* 2002, 124, 6506-6507. (c) Tam, A. Y. Y.; Wong, K. M. C.; Yam, V. W. W. Unusual Luminescence Enhancement of Metallogels of Alkynylplatinum(II) 2,6-Bis(N-alkylbenzimidazol-2'-yl)-pyridine Complexes upon a Gel-to-Sol Phase Transition at Elevated Temperatures. J. Am. Chem. Soc. 2009, 131, 6253-6260. (d) Po, C.; Tam, A. Y. Y; Wong, K. M. C.; Yam, V. W. W. *Supramolecular self-assembly of amphiphilic anionic platinum (II) complexes: A correlation between spectroscopic and morphological properties.* J. Am. Chem. Soc. 2011, 133, 12136-12143.

6 (a) Yu, C.; Chan, K. H. Y.; Wong, K. M. C.; Yam, V. W. W. Nucleic acid-induced self-assembly of a platinum (II) terpyridyl complex: detection of G-quadruplex formation and nuclease activity. *Chem. Commun.* 2009, 46, 3756-3758. (b) Yeung, M. C. L.; Wong, K. M. C.; Tsang, Y. K. T.; Yam, V. W. W. Aptamer-induced self-assembly of a NIR-emissive platinum (II) terpyridyl complex for label- and immobilization-free detection of lysozyme and thrombin. *Chem. Commun.* 2010, 46, 7709-7711. (c) Chan, K. H. Y.; Chow, H. S.; Wong, K. M. C.; Yeung, M. C. L.; Yam, V. W. W. Towards thermochromic and thermoresponsive near-infrared (NIR) luminescent molecular materials through the modulation of inter- and/or intramolecular Pt . . . Pt and π-π interactions. *Chem. Sci.* 2010, 1, 477-482. (d) Chung, C. Y. S.; Yam, V. W. W. Induced Self-Assembly and Förster Resonance Energy Transfer Studies of Alkynylplatinum(II) Terpyridine Complex Through Interaction With Water-Soluble Poly(phenylene ethynylene sulfonate) and the Proof-of-Principle Demonstration of this Two-Component Ensemble for Selective Label-Free Detection of Human Serum Albumin. *J. Am. Chem. Soc.* 2011, 133, 18775-18784. (e) Chung, C. Y. S.; Yam, V. W. W. Selective label-free detection of G-quadruplex structure of human telomere by emission spectral changes in visible-and-NIR region under physiological condition through the FRET of a two-component PPE-SO3-Pt(II) complex ensemble with Pt . . . Pt, electrostatic and π-π interactions. *Chem. Sci.* 2013, 4, 377-387. (f) Chan, C.; Chung, C. Y. S.; Yam, V. W. W. Parallel folding topology-selective label-free detection and monitoring of conformational and topological changes of different G-quadruplex DNAs by emission spectral changes via FRET of mPPE-Ala-Pt(II) complex ensemble. *Chem. Sci.* 2016, 7, 2842-2855.

7 (a) Li, K.; Tong, G. S. M.; Wan, Q.; Cheng, G.; Tong, W. Y.; Ang W. H.; Kwong, W. L.; Che, C. M. Highly phosphorescent platinum (II) emitters: photophysics, materials and biological applications. *Chem. Sci.* 2016, 7, 1653-1673. (b) Fleetham, T.; Li, G.; Li, J. Phosphorescent Pt (II) and Pd (II) Complexes for Efficient, High-Color-Quality, and Stable OLEDs. *Adv. Mater.* 2017, 29, 1601861.

8 (a) Jarosz, P.; Du, P. W.; Schneider, J.; Lee, S. H.; McCamant, D.; Eisenberg, R. Platinum(II) Terpyridyl Acetylide Complexes on Platinized $TiO_2$: Toward the Photogeneration of $H_2$ in Aqueous Media. *Inorg. Chem.* 2009, 48, 9653-9663. (b) Du, P. W.; Schneider, J.; Jarosz, P.; Zhang, J.; Brennessel, W. W; Eisenberg, R. Photoinduced electron transfer in platinum(II) terpyridyl acetylide chromophores: reductive and oxidative quenching and hydrogen production. *J. Phys. Chem. B* 2007, 111, 6887-6894. (c) Du, P. W; Schneider, J.; Fan, L.; Zhao, W; Patel, U.; Castellano, F. N.; Eisenberg, R. Bi- and terpyridyl platinum (II) chloro complexes: molecular catalysts for the photogeneration of hydrogen from water or simply precursors for colloidal platinum? *J. Am. Chem. Soc.* 2008, 130, 5056-5058. (d) Li, G.; Mark, M. F.; Lv, H.; McCamant, D. W; Eisenberg, R. Rhodamine-Platinum Diimine Dithiolate Complex Dyads as Efficient and Robust Photosensitizers for Light-Driven Aqueous Proton Reduction to Hydrogen. *J. Am. Chem. Soc.* 2018, in press, DOI: 10.1021/jacs.7b11581.

9 (a) Jennette, K. W; Lippard, S. J.; Bassiliades G. A. Bauer, W. R. Metallointercalation reagents. 2-hydroxyethanethiolato (2,2',2"-terpyridine)-platinum(II) monocation binds strongly to DNA by intercalation. *Proc. Natl. Acad. Sci. U.S.A* 1974, 71, 3839-3843. (b) Jennette, K. W.; Gill, J. T.; Sadownick J. A.; Lippard, S. J. Metallointercalation reagents. Synthesis, characterization, and structural properties of thiolato (2, 2', 2"-terpyridine) platinum (II) complexes. *J. Am. Chem. Soc.* 1976, 98, 6159-6186. (c) Lippard, S. J. Platinum complexes: probes of polynucleotide structure and antitumor drugs. *Acc. Chem. Res.* 1978, 11, 211-217. (d) McMillin, D. R.; Moore, J. J. *Luminescence that lasts from Pt(trpy)Cl$^+$ derivatives (trpy=2,2';6',2"-terpyridine).* Coord. Chem. Rev. 2002, 229, 113-121. (e) Cummings, S. D. Platinum complexes of terpyridine: interaction and reactivity with biomolecules. *Coord. Chem. Rev.* 2009, 253, 1495-1516. (f) McGuire Jr., R.; McGuire, M. C.; McMillin, D. R. Platinum (II) polypyridines: A tale of two axes. *Coord. Chem. Rev.* 2010, 254, 2574-2583. (g) Zou, T.; Liu, J.; Lum, C. T.; Ma, C.; Chang, R. C. T.; Lok, C. N.; Kwok, W. M.; Che, C. M. Luminescent Cyclometalated Platinum(II) Complex Forms Emissive Intercalating Adducts with Double-Stranded DNA and RNA: Differential Emissions and Anticancer Activities. *Angew. Chem. Int. Ed.* 2014, 53, 10119-10123.

10 Dujols, V.; Ford, F.; Czarnik, A. W. A Long-Wavelength Fluorescent Chemodosimeter Selective for Cu(II) Ion in Water. *J. Am. Chem. Soc.* 1997, 119, 7386-7387.

11 For some reviews and references therein: (a) Kim, H. N.; Lee, M. H.; Kim, H. J.; Kim, J. S.; Yoon, J. A new trend in rhodamine-based chemosensors: application of spirolactam ring-opening to sensing ions. *Chem. Soc. Rev.* 2008, 37, 1465-1472. (b) Quang, D. T.; Kim, J. S. Fluoro- and chromogenic chemodosimeters for heavy metal ion detection in solution and biospecimens. *Chem. Rev.* 2010, 110, 6280-6301. (c) Chen, X.; Zhou, Y.; Peng, X.; Yoon, J. Fluorescent and colorimetric probes for detection of thiols. *Chem. Soc. Rev.* 2010, 39, 2120-2135. (d) Kim, H. N.; Guo, Z.; Zhu, W.; Yoon, J.; Tian, H. Recent progress on polymer-based fluorescent and colorimetric chemosensors *Chem. Soc. Rev.* 2011, 40, 79-93. (e) Chen, X.; Tian, X.; Shin, I.; Yoon, J. *Fluorescent and luminescent probes for detection of reaction oxygen and nitrogen species.* *Chem. Soc. Rev.* 2011, 40, 4783-4804. (f) Yang, Y.; Zhao, Q.; Feng, W; Li, F. Luminescent chemodosimeters for bioimaging. *Chem. Rev.* 2013, 113, 192-270.

12 (a) Lee, M. H.; Kim, H. J.; Yoon, S.; Park, N.; Kim, J. S. Metal ion induced FRET OFF-ON in Tren/Dansyl-appended rhodamine. *Org. Lett.* 2008, 10, 213-216. (b) Suresh, M.; Mishra, S.; Mishra, S. K.; Suresh, E.; Mandal, A. K.; Shrivastav, A.; Das, A. Resonance Energy Transfer Approach and a New Ratiometric Probe for Hg2+ in Aqueous Media and Living Organism. *Org. Lett.* 2009, 11, 2740-2743. (c) Othman, A. B.; Lee, J. W.; Wu, J. S.; Kim, J. S.; Abidi, P. T.; Strub, J. M.; Dorsselaer, A. V.; Vicens, J. J. Calix[4]arene-Based, $Hg^{2+}$-Induced Intramolecular Fluorescence Resonance Energy Transfer Chemosensor. *Org. Chem.* 2007, 72, 7634-7640. (d) Yuan, M.; Zhou, W; Liu, X.; Zhu, M.; Li, J.; Yin, X.; Zheng, H.; Zuo, Z.; Ouyang, C.; Liu, H.; Li, Y.; Zhu, D. A multianalyte chemosensor on a single molecule: promising structure for an integrated logic gate. *J. Org. Chem.* 2008, 73, 5008-5014. (e) Zhang, X.; Xiao, Y; Qian, X. A ratiometric fluorescent probe based on FRET for imaging $Hg^{2+}$ ions in living cells. *Angew. Chem. Int. Ed.* 2008, 47, 8025-8029.

13 (a) Huang, L.; Zeng, L., Guo, H.; Wu, W; Wu, Wu., Ji, S.; Zhao, J. Room-Temperature Long-Lived $^3$IL Excited State of Rhodamine in an N∧N $Pt^{II}$ Bis(acetylide) Complex with Intense Visible-Light Absorption. *Eur. J. Inorg. Chem,* 2011, 4527-4533. (b) Mármol, J del; Filevich, O.; Etchenique, R. A Ruthenium-Rhodamine Complex as an Activatable Fluorescent Probe. *Anal. Chem.* 2000, 82, 6259-6264

14 (a) Wang, C.; Wong, K. M. C. Bichromophoric rhodamine-iridium (III) sensory system: modulation of the energy-transfer process through a selective sensing behavior. *Inorg. Chem.* 2011, 50, 5333-5335. (b) Wang, C.; Lam, H. C.; Zhu, N.; Wong, K. M. C. Introduction of luminescent rhenium(I), ruthenium(II), iridium(III) and rhodium(III) systems into rhodamine-tethered ligands for the construction of bichromophoric chemosensors. *Dalton Trans.* 2015, 44, 15250-15263. (c) Wong, K. M. C.; Wang, C.; Lam, H. C.; Zhu, N. Bichromophoric rhodamine-rhenium(I) and -iridium(III) sensory system: Synthesis, characterizations, photophysical and selective metal ions binding studies. *Polyhedron,* 2015, 86, 133-140.

15 (a) Wang, C.; Wong, K. M. C. Selective $Hg^{2+}$ Sensing Behaviors of Rhodamine Derivatives with Extended Conjugation Based on Two Successive Ring-Opening Processes. *Inorg. Chem.* 2013, 52, 13432-13441. (b) Li, L.; Wang, C.; Wu, J.; Tse, Y. C.; Cai, Y. P. A Molecular Chameleon with Fluorescein and Rhodamine Spectroscopic Behaviors. *Inorg. Chem.* 2016, 55, 205-213. (c) Li, L.; Wang, S.; Lan, H.; Gong, G.; Zhu, Y.; Tse, Y. C.; Wong, K. M. C. Rhodol Derivatives as Selective Fluorescent Probes for the Detection of $Hg^{II}$ Ions and the Bioimaging of Hypochlorous Acid. *ChemistryOpen* 2018, 7, 136-143.

16 Valeur, B. *Molecular Fluorescence: Principles and Applications*; Wiley-VCH: Weinheim, 2002.

17 (a) Sheldrick, G. M. *Acta Crystallogr.* 2008, A64, 112-122. (b) Sheldrick, G. M. *SHELXL-97: Program for Crystal Structure Solution and Refinement*; University of Göttingen: Göttingen, Germany, 1997.

The invention claimed is:

1. A complex from a combination of a platinum(II) terpyridine system and a rhodamine derivative with spiroring-opening ability, used for ratiometric fluorescent sensing in a presence of $Hg^{2+}$;

wherein the complex has a structure of formula II:

Formula II

2. The complex according to claim 1, used as a selective $Hg^{2+}$ probe.

3. The complex according to claim 1, wherein the complex has a spiroring-opening ability in the presence of $Hg^{2+}$.

4. The complex according to claim 1, wherein the complex has a de-aggregation ability in the presence of $Hg^{2+}$.

5. The complex according to claim 3, used for indicating UV-Vis absorption and emission spectral changes at a same time.

* * * * *